AARON E SMITH.
Wood Sawing Machine.

117340        PATENTED JUL 25 1871

Witnesses        Inventor
N. C. Gridley        Aaron E. Smith
N. H. Sherburne        By Farwell & Co
       his attys

UNITED STATES PATENT OFFICE.

AARON E. SMITH, OF LIBERTYVILLE, ILLINOIS.

IMPROVEMENT IN SAWING-MACHINES.

Specification forming part of Letters Patent No. 117,340, dated July 25, 1871.

*To all whom it may concern:*

Be it known that I, AARON E. SMITH, of Libertyville, Lake county, State of Illinois, have invented a new and useful Improvement in Wood-Sawing Machines; and I do hereby declare the following to be a full, clear, and exact description thereof, which will enable others skilled in the art to which my invention appertains to make and use the same, reference being had to the accompanying drawing forming part of this specification, in which—

Figure 1:
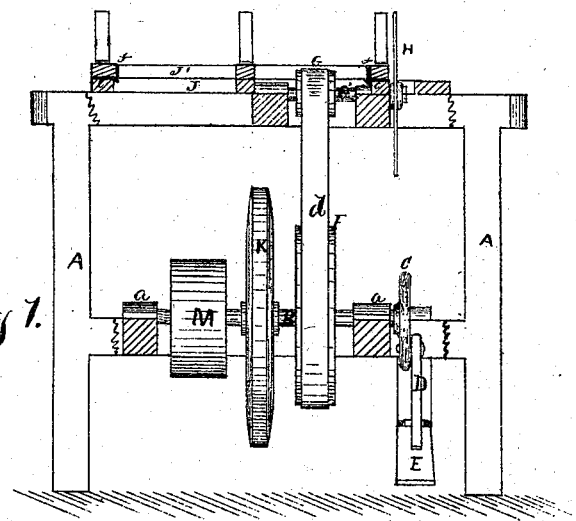
Figure 2:
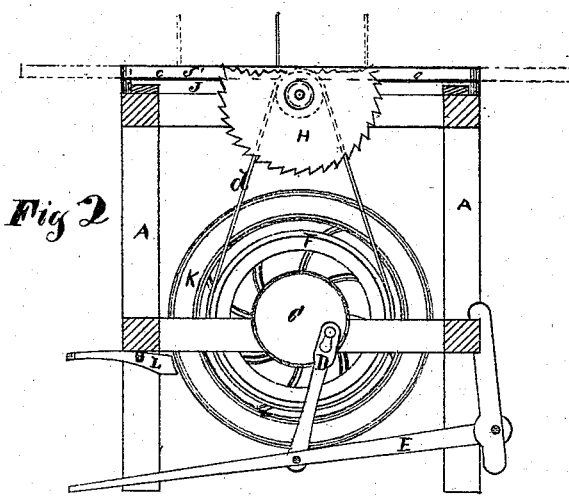

Figure 1 is a front elevation of my machine with a portion of the frame broken away, showing the moving parts thereof; and Fig. 2 is a vertical transverse section, showing those parts of the machine which are to the left hand of the line $x\ x$ drawn through Fig. 1.

Similar letters of reference indicate corresponding parts in both figures of the drawing.

The object of my invention is to provide a machine for sawing wood; and the improvement consists in arranging the several parts in such a manner as to allow the machine to be operated by a treadle or by steam or horse-power, as desired, a description of which in detail will be hereinafter more fully given.

In the accompanying drawing, A represents the frame, which may be as shown, or may be of any suitable shape that will receive the moving parts of the machine. B is the main driving-shaft, the ends of which are secured in boxes $a\ a$ affixed to the cross-girts of the frame. Firmly secured to the end of said shaft is a crank or crank-wheel, C, to which is attached the connecting-rod D, which extends downward and is jointed at its lower end to the center of treadle E, the rear end of which is hinged to the frame in a manner which admits of a tilting movement to its forward end. Thus, as the treadle is operated, a rotary movement is imparted to the shaft. Affixed on said shaft, near the crank-wheel, is the driving-wheel F, around which is a belt, $d$, extending upward to and around a pulley, G, on shaft $G'$, which is secured in suitable boxes affixed to the upper side of the frame, and upon the end of which shaft the saw H is attached. Firmly attached to the upper side of the frame is a platform-frame, J, to which is secured metal ways G, which support the movable platform $J'$. To the inner side of the girts of said movable platform are affixed metal guides $f$, the lower ends of which are bent or formed to fit around and under the edges of ways $e$, by which the platform is secured in position, the same being so arranged as to slide upon said ways forward and backward in the direction of its length. Secured upon the main driving-shaft B is a balance-wheel, K, by which a steadiness of motion is imparted to the saw. Pivoted to the lower side of one of the cross-girts of the machine is a brake, L, which is so arranged as to bring its inner end in contact with and against the periphery of the balance-wheel as its outer end is forced downward, the object of which is to stop the saw instantaneously, when desired. I secure upon said driving-shaft, near its end, a band-wheel, M, around which a belt from any suitable machinery may pass, when desired, to operate the machine by steam, horse, or other similar power.

It will be noticed that the driving-shaft upon which the balance-wheel is secured is below the moving platform, thus leaving an unobstructed surface upon the platform for the wood to be sawed as the same passes over the wheel, by which means any desired length of wood may be cut or sawed.

Having thus described my invention, what I claim as new, and desire to secure by Letters Patent, is—

In combination, the shaft B, balance-wheel K, driving-wheel F, belt $d$, pulley G, shaft $G'$, saw H, platform $J\ J'$, crank-wheel C, connecting-rod D, treadle E, and brake L, the whole arranged to operate together, substantially as and for the purpose described.

The above specification of my invention signed by me this 15th day of December, A. D. 1870.

AARON E. SMITH.

Witnesses:
 N. C. GRIDLEY,
 N. H. SHERBURNE.